United States Patent
Huang et al.

(10) Patent No.: US 10,366,503 B2
(45) Date of Patent: Jul. 30, 2019

(54) METHOD AND APPARATUS OF SCENE RECONSTRUCTION

(71) Applicant: SHENZHEN UNIVERSITY, Shenzhen (CN)

(72) Inventors: Hui Huang, Shenzhen (CN); Kai Xu, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 113 days.

(21) Appl. No.: 15/712,152

(22) Filed: Sep. 22, 2017

(65) Prior Publication Data
US 2019/0035096 A1    Jan. 31, 2019

(30) Foreign Application Priority Data
Jul. 25, 2017    (CN) .......................... 2017 1 0613012

(51) Int. Cl.
*G06T 7/50* (2017.01)
*G05D 1/00* (2006.01)
*G05D 1/02* (2006.01)
*B25J 19/02* (2006.01)
*B25J 9/16* (2006.01)

(52) U.S. Cl.
CPC .............. *G06T 7/50* (2017.01); *B25J 9/1664* (2013.01); *B25J 19/023* (2013.01); *G05D 1/0094* (2013.01); *G05D 1/0246* (2013.01); *G05D 2201/0207* (2013.01); *G06T 2207/10024* (2013.01); *G06T 2207/10028* (2013.01); *Y10S 901/01* (2013.01)

(58) Field of Classification Search
CPC ............. G06T 7/50; G06T 2207/10024; G06T 2207/10028; G05D 1/0094; G05D 1/0246; G05D 2201/0207; B25J 19/023; B25J 9/1664; Y10S 901/01
See application file for complete search history.

(56) References Cited

U.S. PATENT DOCUMENTS 8,072,470 B2 * 12/2011 Marks ..................... A63F 13/10
                                                                345/473
8,471,895 B2 *  6/2013 Banks ................... G01S 7/4816
                                                                 348/46

(Continued)

OTHER PUBLICATIONS

Juberts et al. "Status Report on Next Generation LADAR for driving unmanned ground vehicles" Proceedings of SPIE, vol. 5609 (2004) pp. 1-12.*

*Primary Examiner* — Mia M Thomas
(74) *Attorney, Agent, or Firm* — Platinum Intellectual Property LLP

(57) ABSTRACT

A method of scene reconstruction includes: a depth image taken by a camera mounted on a robot is acquired, and a current tensor field key frame is generated based on the depth image; spatial-temporal interpolation is performed on the current tensor field key frame and a previous tensor field key frame to obtain an interpolated tensor field key frame; a robot planning path is acquired by particle advection algorithm according to the current tensor field key frame, the previous tensor field key frame, and the interpolated tensor field key frame; a camera planning path is acquired according to the robot planning path and an energy equation of the camera; and a scene is reconstructed according to the depth images captured by the camera.

18 Claims, 12 Drawing Sheets

(56) References Cited

U.S. PATENT DOCUMENTS

| | | | |
|---|---|---|---|
| 8,705,893 B1* | 4/2014 | Zhang | G06K 9/00201 |
| | | | 345/418 |
| 9,497,380 B1* | 11/2016 | Jannard | H04N 5/23238 |
| 2003/0046046 A1* | 3/2003 | Fischer | G06T 17/20 |
| | | | 703/6 |
| 2005/0171654 A1* | 8/2005 | Nichols | G08G 5/0078 |
| | | | 701/15 |
| 2007/0093945 A1* | 4/2007 | Grzywna | G05D 1/101 |
| | | | 701/23 |
| 2008/0150965 A1* | 6/2008 | Bischoff | G02B 27/01 |
| | | | 345/632 |
| 2008/0273751 A1* | 11/2008 | Yuan | G06K 9/32 |
| | | | 382/103 |
| 2009/0087029 A1* | 4/2009 | Coleman | G06K 9/00208 |
| | | | 382/103 |
| 2016/0070264 A1* | 3/2016 | Hu | G08G 5/0069 |
| | | | 701/2 |
| 2016/0070265 A1* | 3/2016 | Liu | B64C 39/024 |
| | | | 701/3 |
| 2016/0076892 A1* | 3/2016 | Zhou | B64C 39/024 |
| | | | 701/3 |
| 2016/0132754 A1* | 5/2016 | Akhbardeh | G06T 7/20 |
| | | | 382/103 |
| 2016/0378109 A1* | 12/2016 | Raffa | G05D 1/0038 |
| | | | 701/2 |
| 2017/0031369 A1* | 2/2017 | Liu | G05D 1/102 |
| 2017/0193830 A1* | 7/2017 | Fragoso | G08G 5/0069 |
| 2017/0199496 A1* | 7/2017 | Grata | G02B 27/0944 |
| 2017/0269588 A1* | 9/2017 | Lema | B64C 39/024 |
| 2017/0301111 A1* | 10/2017 | Zhao | G06T 7/80 |
| 2018/0046153 A1* | 2/2018 | Yu | B25J 9/1671 |
| 2018/0120847 A1* | 5/2018 | Chen | B64C 39/024 |
| 2019/0035099 A1* | 1/2019 | Ebrahimi Afrouzi | G06T 7/344 |

\* cited by examiner

METHOD AND APPARATUS OF SCENE RECONSTRUCTION

CROSS REFERENCE TO RELATED APPLICATION

This application claims priority to Chinese Patent Application No. 2017106130125, entitled "METHOD, APPARATUS, COMPUTER DEVICE AND COMPUTER-READABLE STORAGE MEDIUM OF SCENE RECONSTRUCTION" filed on Jul. 25, 2017, the content of which is expressly incorporated by reference herein in its entirety.

FIELD OF THE INVENTION

The present disclosure relates to image processing, and in particular relates to a method, an apparatus and at least one non-transitory computer storage medium of scene reconstruction.

BACKGROUND OF THE INVENTION

With the popularity of the RGB-D (Red-Green-Blue-Depth) camera with low cost and the development of the real-time reconstruction technology, the automatic indoor scene reconstruction issue based on a mobile robot has drawn attention from fields of robotics and graphics, it is the development of these technologies which allows us to explore and reconstruct scenes at a larger scale and a greater complexity, which is widely used in various fields such as virtual reality, games, movies, service robots and auto drive and so on. As to scene reconstruction, in the conventional technology, it is merely individual object scanning or fixed camera scene exploration, the reconstructible space dimension is restricted.

SUMMARY

According to various embodiments, a method, an apparatus, and at least one non-transitory computer storage medium of scene reconstruction are provided.

A method of scene reconstruction includes:
acquiring a depth image taken by a camera mounted on a robot and generating a current tensor field key frame based on the depth image;
performing spatial-temporal interpolation on the current tensor field key frame and a previous tensor field key frame to obtain an interpolated tensor field key frame;
acquiring a robot planning path by particle advection algorithm according to the current tensor field key frame, the previous tensor field key frame, and the interpolated tensor field key frame;
acquiring a camera planning path according to the robot planning path and an energy equation of the camera; and
reconstructing a scene according to the depth images captured by the robot along the robot planning path and the camera along the camera planning path.

An apparatus comprising at least one memory storing instructions; and at least one processor that executes the instructions to cause the steps of:
performing spatial-temporal interpolation on the current tensor field key frame and a previous tensor field key frame to obtain an interpolated tensor field key frame;
acquiring a robot planning path by particle advection algorithm according to the current tensor field key frame, the previous tensor field key frame, and the interpolated tensor field key frame;
acquiring a camera planning path according to the robot planning path and an energy equation of the camera; and
reconstructing a scene according to the depth images captured by the robot along the robot planning path and the camera along the camera planning path At least one non-transitory computer-readable storage medium having instructions stored thereon that, when executed by at least one processor, cause the steps of:
performing spatial-temporal interpolation on the current tensor field key frame and a previous tensor field key frame to obtain an interpolated tensor field key frame;
acquiring a robot planning path by particle advection algorithm according to the current tensor field key frame, the previous tensor field key frame, and the interpolated tensor field key frame;
acquiring a camera planning path according to the robot planning path and an energy equation of the camera; and
reconstructing a scene according to the depth images captured by the robot along the robot planning path and the camera along the camera planning path.

The above and other features of the invention including various novel details of construction and combinations of parts, and other advantages, will now be more particularly described with reference to the accompanying drawings and pointed out in the claims.

BRIEF DESCRIPTION OF THE DRAWINGS

The above objects, features and advantages of the present disclosure will become more apparent by describing in detail embodiments thereof with reference to the accompanying drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION OF THE EMBODIMENTS

Figure 1:
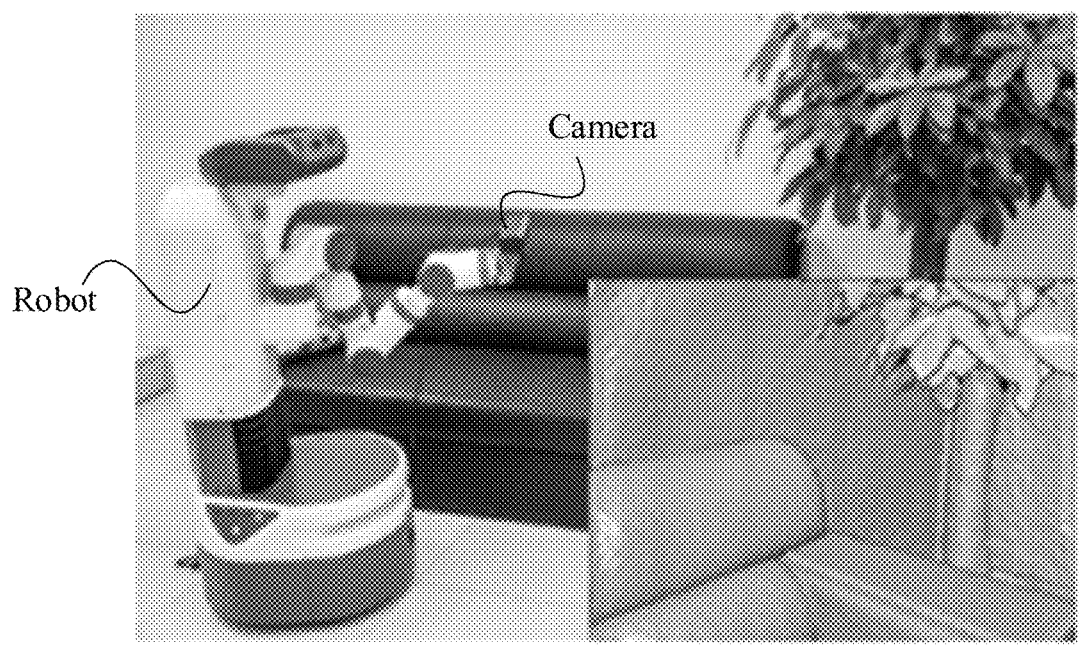
FIG. 1 is a schematic diagram of a method of scene reconstruction according to an embodiment.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring to FIG. 1, which is a schematic diagram of a method of scene reconstruction according to an embodiment. The robot is positioned in an unknown scene to be explored. the unknown scene can be an indoor or outdoor scene, the indoor scene can be considered a scene composited by walls and furniture. The robot holds a camera by a hand and walks in the unknown scene. The camera takes photos of the unknown scene and performs scene reconstruction according to the photos. The robot can be a Fetch robot or other robots, the camera can be a RGB-D (Red-Green-Blue-Depth) camera.

Figure 2:
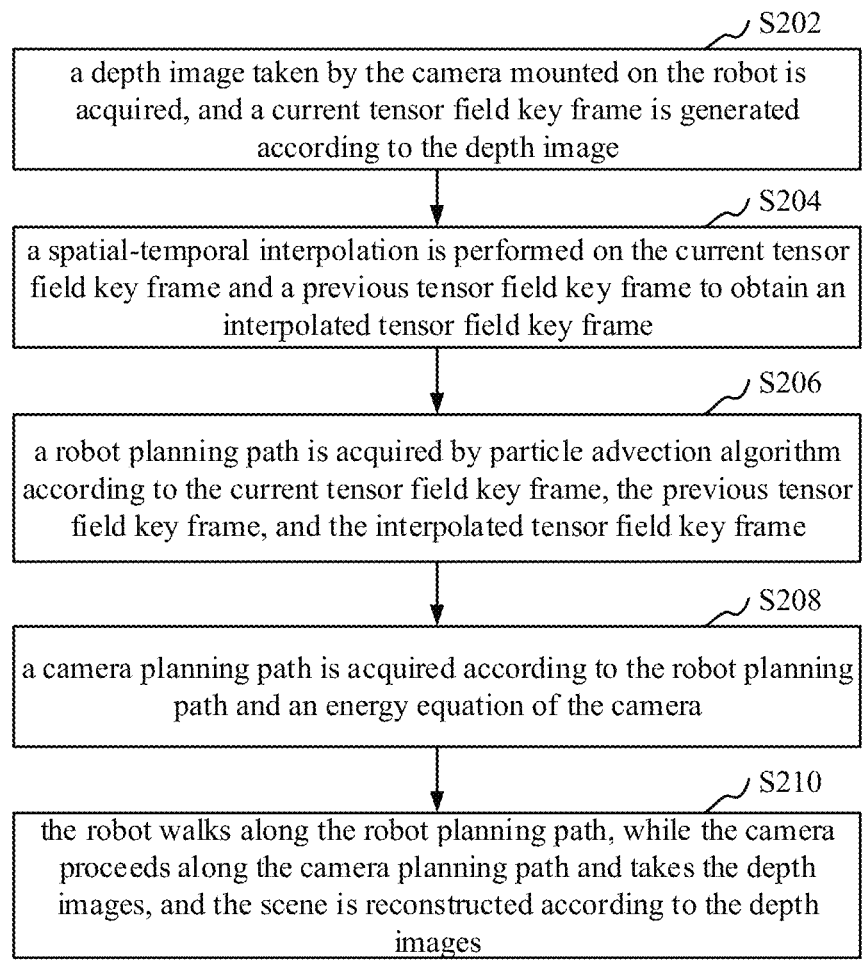
FIG. 2 is a flowchart of a method of scene reconstruction according to an embodiment.

Referring to FIG. 2, in one embodiment, a scene reconstruction method is provided, which can be applied to the robot in FIG. 1. A scene reconstruction program is running on the robot, whereby the scene reconstruction method is implemented. The method includes the following steps in particular:

In step S202, a depth image taken by the camera mounted on the robot is acquired, and a current tensor field key frame is generated according to the depth image.

Specifically, the depth image is the image taken by the RGB-D camera, which is also called a range image, and refers to the image that takes the distances from the RGB-D camera to various points in the scene to be the pixel values, it directly reflects the geometric shapes of the visible surfaces of the scene, the depth image can be a color depth image. A current tensor field key frame of the current scene can be generated according to the depth image.

The tensor field of the two dimensional space is a smooth tensor value function T: $\mathbb{D} \to \mathbb{R}^{2\times 2}$, each point $p \in \mathbb{D}$ is assigned with a second order tensor:

$$T_i(p) = \begin{pmatrix} \tau_{11}(p)\tau_{12}(p) \\ \tau_{21}(p)\tau_{22}(p) \end{pmatrix}$$

If and only if $\tau_{ij}=\tau_{ji}(i\neq j)$, tensor $[\tau_{ij}]$ is symmetric.

A symmetric tensor T can be uniquely decomposed into an isotropic part S and an anisotropic part A:

$$T = S + A = \lambda \begin{pmatrix} 1 & 0 \\ 0 & 1 \end{pmatrix} + \mu \begin{pmatrix} \cos 2\theta & \sin 2\theta \\ \sin 2\theta & -\cos 2\theta \end{pmatrix}$$

Where $\mu>0$ and $\theta\in[0,2\Pi)$. The major and secondary eigenvectors of T are perpendicular to each other.

The movement of the robot is guided by the major eigenvectors at a given point. A key feature of the symmetric tensor field is its orientation ambiguity, which makes it equivalent to a line field that does not distinguish between forward and backward, thereby avoiding the problem of vector orientation in computing vector fields under geometric constraints.

In step S204, a spatial-temporal interpolation is performed on the current tensor field key frame and a previous tensor field key frame to obtain an interpolated tensor field key frame.

In particular, as the distance in the actual three dimensional space and corresponding to the current tensor field key frame and the previous tensor field key frame may be relatively long, while the position of the robot cannot have a sudden change, as such, several interpolated tensor field key frames are interpolated between the current tensor field key frame and the previous tensor field key frame, thereby enabling the robot to smooth the robot planning path according to the interpolated tensor field key frame.

In step S206, a robot planning path is acquired by particle advection algorithm according to the current tensor field key frame, the previous tensor field key frame, and the interpolated tensor field key frame.

In particular, after the interpolation is completed, several interpolated tensor field key frame can be obtained, a robot planning path is acquired according to the current tensor field key frame, the previous tensor field key frame, and the interpolated tensor field key frame and through particle advection algorithm.

In step S208, a camera planning path is acquired according to the robot planning path and an energy equation of the camera.

In particular, the main object of the scene reconstruction is to perform a joined optimization to the robot planning path and the camera planning path, such that the robot, with the camera on its hand, can simultaneously conduct exploration and reconstruction of a complex scene.

First of all, in order to improve the scanning efficiency, each point on the camera planning path shall ensure a maximal coverage on unscanned areas and unknown areas. However, to ensure a proper reconstruction quality, coverage on unknown areas alone is not enough, each scanning shall preferably be directed as possible to the normal of the target surfaces to ensure a best scanning quality.

Second, to facilitate frame-to-frame registration during real-time reconstruction, linear and angular speed of the camera should not be exceeding a maximum threshold.

Third, with a given robot planning path and the constraint of the robot base, to satisfy that each point of the camera on the robot arm can be reached by the robot, the camera planning path is planned through the robot planning path and the camera energy equation.

In step S210, the robot walks along the robot planning path, while the camera proceeds along the camera planning path and takes the depth images, and the scene is reconstructed according to the depth images.

In particular, after the robot planning path and the camera planning path are planned, the robot walks along the robot planning path and the camera held by the robot walks along the camera planning path, and depth images are taken by the camera. The robot can perform a real-time scene reconstruction by voxel hashing algorithm or by elastic fusion algorithm.

According to the foregoing method of scene reconstruction, through a joined optimization of robot path and camera path, i.e., obtaining the camera planning path through the robot planning path and the camera energy equation, a simultaneous exploration and reconstruction of a complex scene by the robot with the camera on its hand is completed, and the robot planning path planning is performed in combination with the tensor field and spatial-temporal interpolation, such that the robot planning path is smoothened and hence smoothening the camera planning path.

Figure 3:
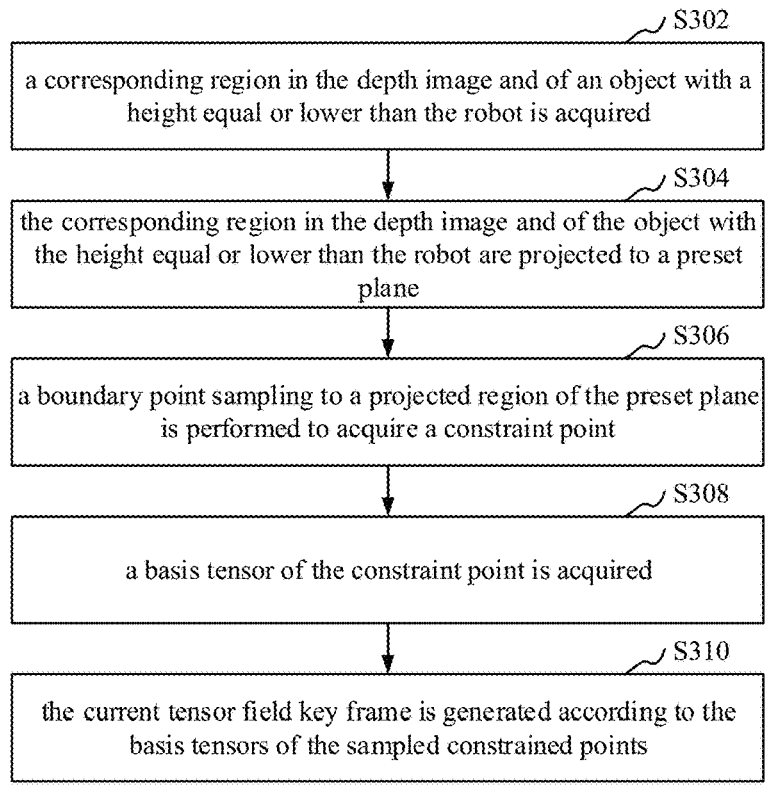
FIG. 3 is a flowchart of step S202 of FIG. 2.

Referring to FIG. 3, which is a flowchart of step S202 of FIG. 2, step S202, i.e., the step of generating a current tensor field key frame according to the depth image includes:

In step S302, a corresponding region in the depth image and of an object with a height equal or lower than the robot is acquired.

Specifically, the scene collection is maintained and updated via two volumetric representations, an occupancy grid (OG) for spatial exploration and a truncated signed distance field (TSDF) for surface reconstruction. The complex spatial occupancy information can be stored by way of an Octomap, e.g., when the occupancy information in a certain region is voluminous, i.e., objects in a corresponding 3D space is relatively of a large number, the divided OG can further be divided into eight portions, so as to improve the accuracy of describing the objects.

In particular, as objects taller than the robot will not affect the operation of the robot, i.e., will not be obstacles in the way of the robot. As such, those objects in the depth image will not be used to plan the robot planning path, the regions corresponding to the objects taller than the robot and in the depth image will only be used for scene reconstruction.

In step S304, the corresponding region in the depth image and of the object with the height equal or lower than the robot are projected to a preset plane.

In particular, with a given scene of the current moment, i.e., the depth image taken by the robot at present, a key frame can be calculated through the geometric constraints of the scene. To this end, the grid cells corresponding to known surfaces in the Octomap grid are projected onto the preset plane. The surface cells which are higher than the robot height are not projected since they will not affect robot movement. The cells corresponding to the known surfaces are depth image regions where objects are present. The preset plane can be a floor plane, i.e., prior to the path planning, a xyz coordinate system is built based on the depth images taken, the xoy plane is the very preset plane which is corresponding to the floor of the scene to be reconstructed, i.e., the floor plane.

In step S306, a boundary point sampling to a projected region of the preset plane is performed to acquire a constraint point.

Specifically, a point sampling is performed to the boundary of the region projected to the preset plane, and the distances between each sampling point can be configured to be 0.2 meters or else, each sampling point is the constraint point, each constraint point is provided with a normal information.

In step S308, a basis tensor of the constraint point is acquired.

In particular, the tensor field of the 2D space is a smooth tensor value function T: $\mathbb{D} \to \mathbb{R}^{2\times2}$ which provides each point $p \in \mathbb{D}$ with a second order tensor:

$$T_i(p) = \begin{pmatrix} \tau_{11}(p) \tau_{12}(p) \\ \tau_{21}(p) \tau_{22}(p) \end{pmatrix}$$

In step S310, the current tensor field key frame is generated according to the basis tensors of the sampled constrained points.

Specifically, a relatively smaller eigenvector of each constraint point is uniformized to a unit vector, such that the whole tensor field is a regular field, and eventually merging basis tensors of the constraint points using Gaussian radial basis function, the key frame of the current tensor field is acquired:

$$T(p) = \Sigma_i e^{-\frac{\|p-p_i\|^2}{\sigma^2}} T_i(p)$$

Where $T_i$ is a basis field computed around constraint point $p_i$, and the Gaussian band width $\sigma$ can be used to control the range of influence of a basis field tensor. Since geometric constraints are mainly used for local path guidance, they do not need a large range of influence. Thus, the band width value $\sigma=2.5\ d_s$, which can be adjusted according to the particular situation and is not limited thereto.

In the forgoing embodiment, by projecting corresponding regions in the depth image and of objects with a height higher or lower than the robot onto the preset plane to identify the obstacles that may influence the robot movement. And sample on the projections of the objects to get the constraint points in order to compute a current tensor field key-frame according to the basis tensors of the constraints points, thereby generating a smooth robot movement track and avoiding the problem of local optimum and instability when using potential fields in path planning.

In an embodiment, step S204 illustrated in FIG. 2, i.e., the step of performing spatial-temporal interpolation on the current tensor field key frame and a previous tensor field key frame to obtain the interpolated tensor field key frame may include: a scalar field of the current tensor field key frame and a scalar field of a previous tensor field key frame is acquired and a bi-harmonic energy function is formulated.

The bi-harmonic energy function to acquire the interpolated tensor field key frame is minimized using the scalar field of the current tensor field key frame and the scalar field of the previous tensor field key frame as dirichlet boundary conditions.

In particular, given two adjacent key frames of fields $T^{t-1}$ and $T^t$, n+1 tensor fields are interpolated such that the field is smoother as the time varies. The bi-harmonic energy function is minimized using the tensor field key frame at t−1, i.e., the key frame of the last tensor field, and the tensor field key frame at t, i.e., the current tensor field key frame, as dirichlet boundary conditions:

$$\|\nabla_{ST}\tau\|^2 + \alpha\|\tau(;0) - \tau(;t-1)\|^2 + \alpha\|\tau(;n) - \tau(;t)\|^2$$

Where $\nabla_{ST}$ is the spatial-temporal Laplacian transformation, $\tau(v;t)$ is the scalar value of point v in the tensor field key frame and at time t, $\tau(;0)$ is the scalar field of the interpolated first interpolated tensor field key frame, $\tau(;n)$ is the scalar field of the interpolated frame No. n+1 interpolated tensor field key frame, $\tau(;t)$ is the scalar field at time t, $\tau(;t-1)$ is the scalar field at time t−1, namely the scalar field of the last tensor field key frame, $\tau$ can either be $\tau_{11}$ or $\tau_{12}$, and $\alpha=5\times10^3$ is the weight of the boundary condition. The discrete spatial-temporal Laplacian transformation can be described as:

$$\omega\tau(i;j) = \Sigma_{k\in N(i)}\omega_S\tau(k;j) + \omega_T\tau(i;j-1) + \omega_T\tau(i;j+1)$$

N(i) is the set of 1-ring neighbors of point i in each tensor field key frame. $\omega_S$ is the intra-frame (spatial) Laplacian transformation weight and $\omega_T$ is the intra-frame (temporal) Laplacian transformation weight. And $\omega = \Sigma_{k\in N(i)}\omega_S + 2\omega_T$ is the normalization weight. It is set $\omega_S=1$ and $\omega_T=2$ as default. $\tau(i;j)$ is the scalar value of point i in the tensor field key frame at time j, $\tau(k;j)$ is the scalar value of point k in the tensor field key frame at time j, and $\tau(i;j-1)$ is the scalar value of point i in the tensor field key frame at time j−1, and $\tau(i;j+1)$ is the scalar value of point i in the tensor field key frame at time j+1.

Figure 4:
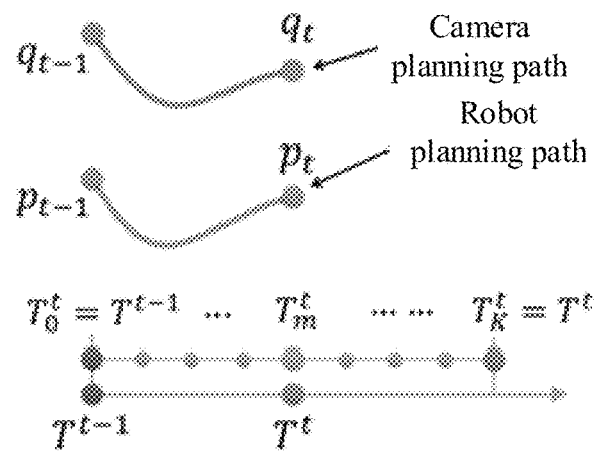
FIG. 4 is a schematic diagram of a tensor field interpolation according to an embodiment.
Figure 5:
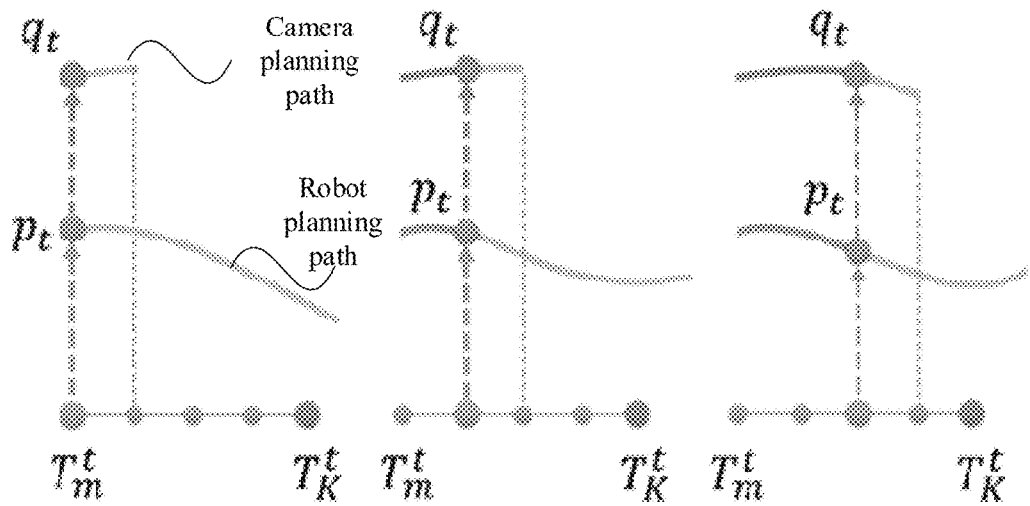
FIG. 5 is a schematic diagram of a robot planning path according to an embodiment.

To ensure temporal coherence, however, one cannot switch from $T^{t-1}$ to $T^t$ directly. K sub-steps are interpolated between $T^t$ and $T^{t-1}$ resulting in a field sequence ($T_0^t = T^{t-1}, \ldots, T_K^t = T^t$). The field-update, as well as the path/track computation, then starts from the middle frame $T_m^t$ (m=K/2), k=n+1, until $T_K^t = T^t$ is reached, at which the above process is restarted. Referring to FIGS. 4 and 5, FIG. 4 is a schematic diagram of a tensor field interpolation according to an embodiment, FIG. 5 is a schematic diagram of a robot planning path according to an embodiment. Based on the smooth transition from $T_m^t$ to $T_K^t$, a smooth robot planning path (lower curves in FIG. 5) is computed via particle advection algorithm, and calculate the camera planning path (upper curves in FIG. 5) constrained by this path. Although the path advection can be done for an arbitrarily long time, the robot takes only the portion of a single sub-step and start a new advection path for every new sub-step. Since the underlying fields transit smoothly, the paths across consecutive sub-steps are smoothly connected.

In the foregoing embodiment, by acquiring the minimal value of the bi-harmonic energy function by discrete spatial-temporal Laplacian transformation, the energy consumption of interpolation tensor field key frame is ensured to be minimal, such that the robot planning path can be more smooth in subsequent robot planning path planning.

Figure 6:
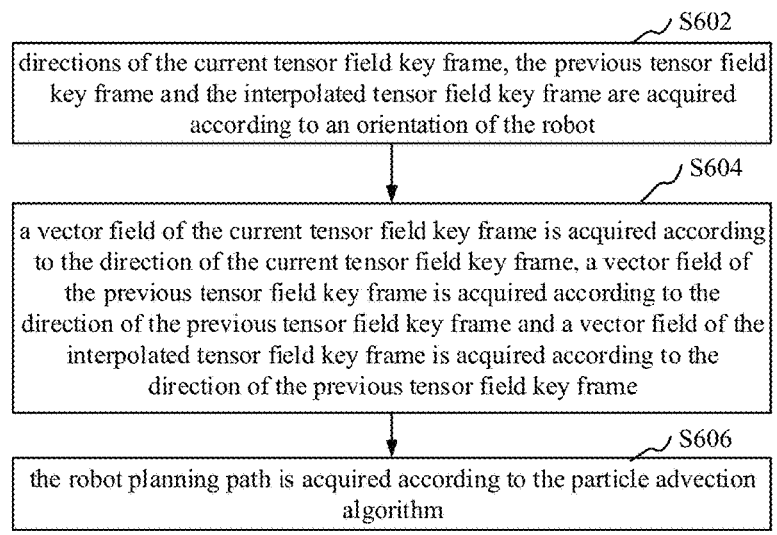
FIG. 6 is a flowchart of step S206 of FIG. 2.

Referring to FIG. 6, which is a flowchart of step S206 of FIG. 2, step S206, i.e., a robot planning path is acquired by particle advection algorithm according to the current tensor field key frame, the previous tensor field key frame, and the interpolated tensor field key frame, includes:

In step S602, directions of the current tensor field key frame, the previous tensor field key frame and the interpolated tensor field key frame are acquired according to an orientation of the robot.

Specifically, starting from the current position of the robot, based on the time-varying tensor field T(t), the robot movement path is computed by particle advection algorithm. Since tensor fields do not distinguish between forward and backward, it is needed to first disambiguate the orientation by orienting the major eigenvectors of the tensors within a local region surrounding the current robot position. This is achieved by letting the major eigenvectors of the tensor field follow the front direction of the robot (the angle between these directions should be less than 90 degrees, to minimize rotation of the robot movement.

In step S604, a vector field of the current tensor field key frame is acquired according to the direction of the current tensor field key frame, a vector field of the previous tensor field key frame is acquired according to the direction of the previous tensor field key frame and a vector field of the interpolated tensor field key frame is acquired according to the direction of the previous tensor field key frame.

Specifically, after the orientation step, the tensor field T(t) becomes a vector field V(t).

In step S606, the robot planning path is acquired according to the particle advection algorithm and through the following equation:

$$p(t) = p_0 + \int_0^t V(p(s); t_0 + t)ds$$

Where p(t) is the robot planning path, $p_0$ is a robot position at time $t_0$, and $V(p(s); t_0+t)$ is a velocity of the robot at time $(t_0+t)$ and position p(s).

Specifically, particle advection algorithm can be expressed as a differential equation:

$$\frac{dp}{dx} = V(p; t).$$

Its solution, given an initial value, is:

$$p(t) = p_0 + \int_0^t V(p(s); t_0 + t)ds$$

Figure 7:
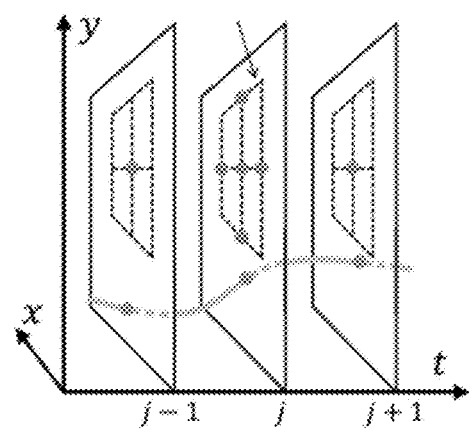
FIG. 7 is a time-varying field calculated on a space-time grid and a path smoothening according to an embodiment.

The path is defined starting from position $p_0$, and time $t_0$. A path for a time period of three time sub-steps is computed. FIG. 7 is a time-varying field calculated on a space-time grid and a path smoothening according to an embodiment.

In a tensor field, a point p is a degenerate point if and only if T(p)=0, and is called a regular point in a case to the contrary. Degenerate points may cause discontinuous or ambiguous robot movement. A degenerate point of a tensor field is equivalent to a singularity in a vector field. However, a vector field usually contains sinks which can trap the robot and moreover, can cause oscillating movement around them due to numerical stability issue. In contrast, a tensor field contains only two types of degenerate points, namely wedges and trisectors, but not sinks, thus avoiding the local trapping issue. In addition, tensor fields allow flexible topological control via manipulating degenerate points.

At the degenerate point, the robot needs to auto-select the path direction and generate a path via the tensor field, as such, special treatment is required on the robot planning path at the degenerate point.

Figure 8:
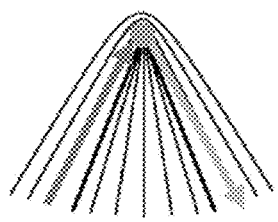
FIG. 8 is a schematic diagram of a wedge degenerate point according to an embodiment.
Figure 9:
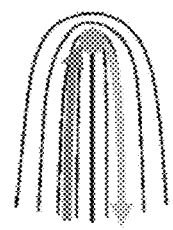
FIG. 9 is a schematic diagram of a wedge degenerate point according to another embodiment.
Figure 10:
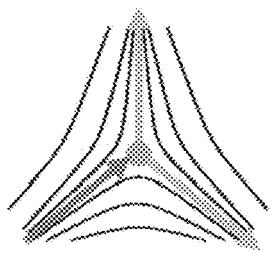
FIG. 10 is a schematic diagram of a trisector degenerate point according to an embodiment.

There are two types of degenerate points, one is wedge degenerate points as shown in FIGS. 8 and 9, the other is the trisector degenerate points, as shown in FIG. 10.

Degenerate points can introduce discontinuities to the generated path, for example, the wedge degenerate points can form a wedge, and trisector degenerate points can cause a diverge in the path, i.e., discontinuities can be introduced to the tensor fields at such locations. Therefore, special treatment is needed at degenerate points to avoid potential problems caused by such discontinuities or ambiguities. There are two solutions: stop and split at a wedge; stop and choose a branch at a trisector.

Figure 11:
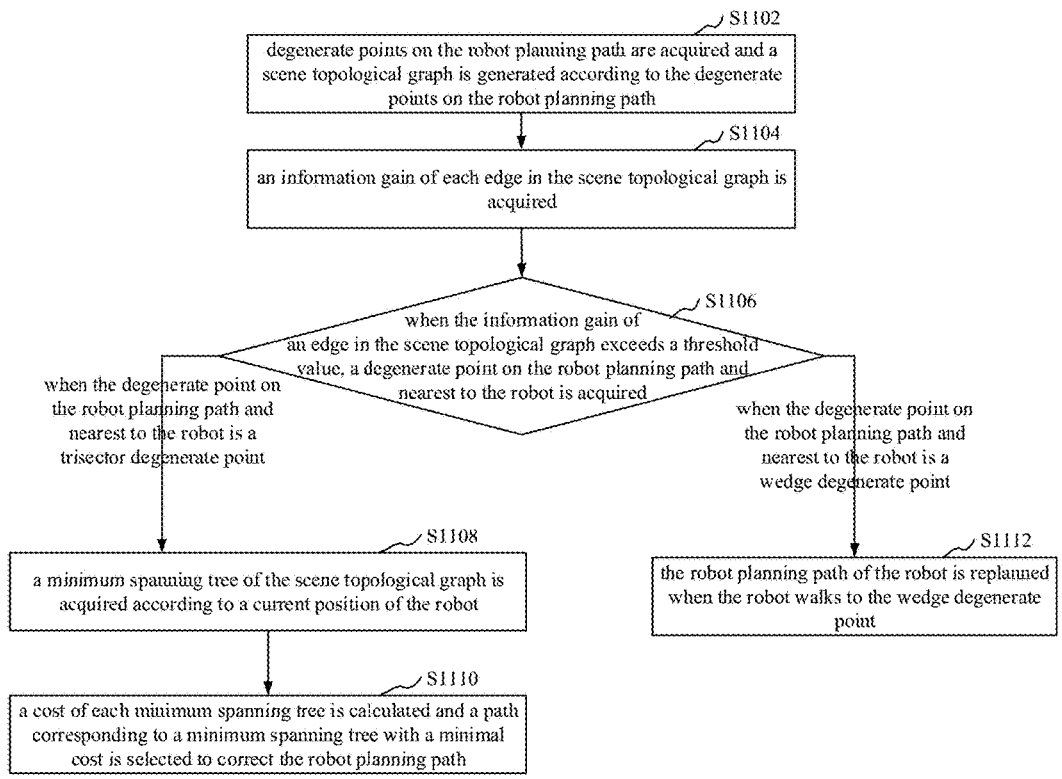
FIG. 11 is a flowchart of a step of path processing at a degenerate point according to an embodiment.
Figure 12:
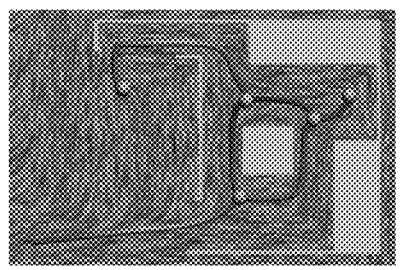
FIG. 12 is a topological diagram of a partial scene according to an embodiment.

FIG. 11 is a flowchart of a step of path processing at a degenerate point according to an embodiment, the step includes:

In step S1102, degenerate points on the robot planning path are acquired and a scene topological graph is generated according to the degenerate points on the robot planning path.

Specifically, when the robot reaches a trisector point, it could have two branches to be selected, as shown in FIG. 10, there is uncertainty in the path selection. This ambiguity is reduced by choosing the better branch by setting two rules. First of all, the selected path shall be clear and without obstacles, further, the selected branch along which more unknown or uncertain regions could be explored. After determining the branch to pursue, the situation is the same to that of the wedge degenerate point, i.e., interpolation and smoothening are performed to both paths, such that the robot will move more steadily.

Figure 13:
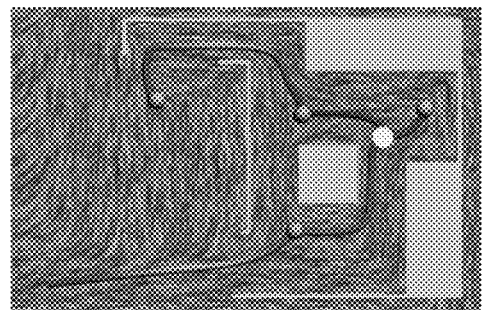
FIG. 13 is a schematic diagram of a minimum spanning tree according to an embodiment.
Figure 14:
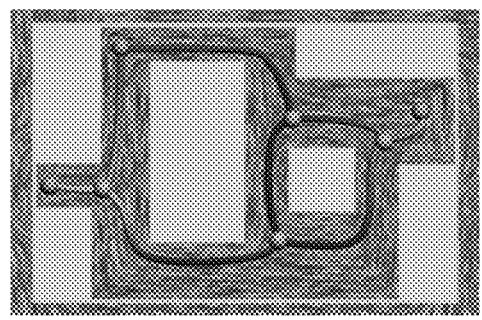
FIG. 14 is a topological diagram of an entire scene according to an embodiment.
Figure 15:
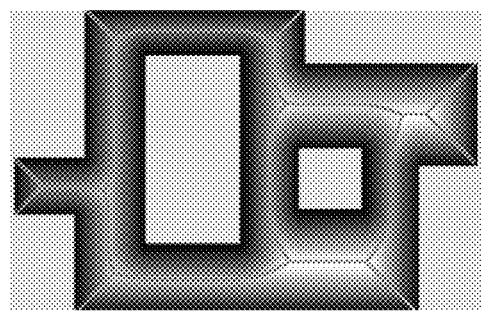
FIG. 15 is a topological diagram after a scene reconstruction according to an embodiment.

Prior to any processing on the degenerate point, as local path advection cannot guarantee a complete coverage of the entire scene. A global instruction system shall hence be introduced to guide the movement of the robot, i.e., the scene topological graph. Referring to FIGS. 12 to 15, FIG. 12 is a topological diagram of a partial scene according to an embodiment, FIG. 13 is a schematic diagram of a minimum spanning tree according to an embodiment, FIG. 14 is a topological diagram of an entire scene according to an embodiment, FIG. 15 is a topological diagram after a scene reconstruction according to an embodiment. When the reconstruction is completed, the topology graph conforms approximately to the medial axis of the full scene boundary. The scene topology graph is generated based on the degenerate points. Given any tensor field, its topological graph can be viewed as an undirected graph with the degenerate points as graph nodes and the separatrices connecting them as edges, as shown in FIG. 14.

In step S1104, an information gain of each edge in the scene topological graph is acquired.

Specifically, given a point, the information gain is defined as the maximum reconstruction uncertainty (entropy) that can be reduced from among all views at that point. Given a reconstruction result, the information gain of a specific view point is measured based on how much unknown region can be observed from the view. Thus, the cost measures the maximal expected reconstruction information gain along the path.

In step S1106, when the information gain of an edge in the scene topological graph exceeds a threshold value, a degenerate point on the robot planning path and nearest to the robot is acquired.

Specifically, the process to the degenerate points include robot walking processing and previous processing, the processing to the degenerate points here is in robot walking. As the robot at a degenerate point need special processing, the degenerate points on the robot planning path and nearest to the robot need to be obtained so as to perform the path selection beforehand.

A notable feature of the topology-based path routing is that it works well also for partially reconstructed scenes (FIG. 11). This is due to two advantageous characteristics of tensor fields. First, topological graph is well defined for any tensor fields computed with any geometric constraint. Second, tensor fields minimize the number of singularities such that no extraneous singularity appears in free space, which least affects the structure and property of the topological graph of the a partial scene, thereby can be favorably adapted to a scene having not been fully scanned.

Based on the topological structure of the tensor field and the definition of information gain, the termination of our autonomous reconstruction system can be defined as: if the expected information gain for all the accessible edges in the topological graph is below a threshold (such as 0.01 or 0.02 etc., and is not limited thereto), the robot stops exploring the scene, as shown in FIG. 14. At this time, the topological skeleton of the tensor field roughly reflects the topology (medial axis) of the scene, each point of the topological skeleton is generated by the geometric restriction after projecting the geometric information of the scene (FIG. 15).

In step S1108, when the degenerate point on the robot planning path and nearest to the robot is a trisector degenerate point, a minimum spanning tree of the scene topological graph is acquired according to a current position of the robot.

Specifically, when a degenerate point is a trisector, first get the minimum spanning tree of the scene topological skeleton, as shown in FIG. 13, is a minimum spanning tree of FIG. 14.

In step S1110, a cost of each minimum spanning tree is calculated and a path corresponding to a minimum spanning tree with a minimal cost is selected to correct the robot planning path.

Specifically, the cost of each edge on the graph is defined as:

$$c(e) = \left(\frac{1}{I(e)}\int_e I(e,p)dp\right)^{-1}$$

Where l(e) is the path length of edge e. I(e, p) is the information gain of reconstruction at a point p on e. By selecting the branch with the lowest cost, the robot typically will select the path that is shortest yet has the highest information gain.

In step S112, when the degenerate point on the robot planning path and nearest to the robot is a wedge degenerate point, the robot planning path of the robot is replanned when the robot walks to the wedge degenerate point.

Specifically, around a wedge degenerate point, the robot planning path may make a sharp turn or even a U-turn, as shown in FIGS. 8 and 9. To avoid shaking of the camera caused by such sudden turns, the closest wedge degenerate point ahead on the robot planning path is detected and the movement speed of the robot is reduced until reaching the wedge degenerate point. At the wedge degenerate point, both robot planning path and camera planning path are replanned, thus splitting the path into two at the wedge degenerate point. During the stop at the wedge degenerate point, the robot computes a smooth connecting path, to smoothly transit between the two separate camera planning paths.

Figure 16:
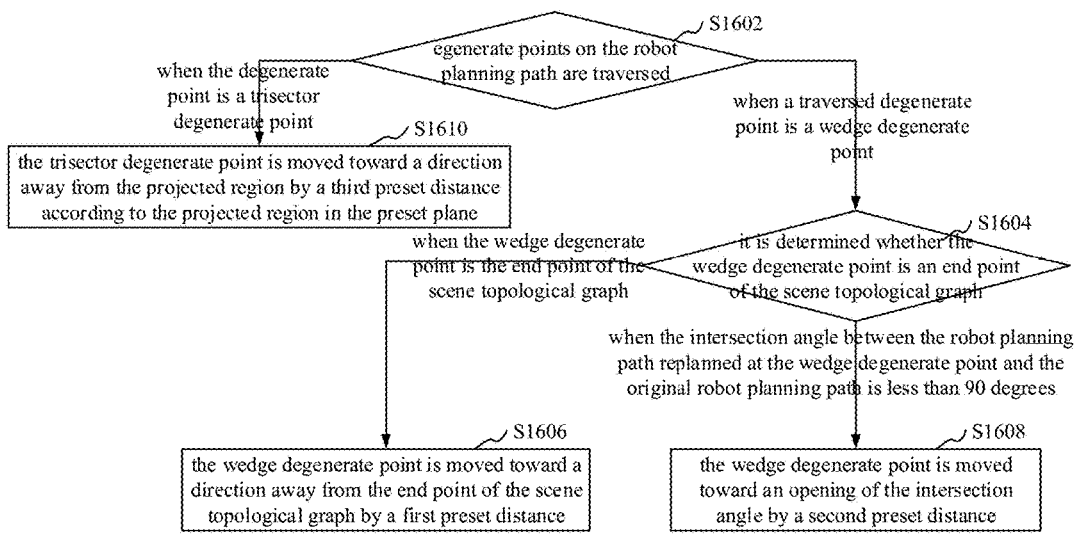
FIG. 16 is a flowchart of a step of a degenerate point movement according to an embodiment.
Figure 17:
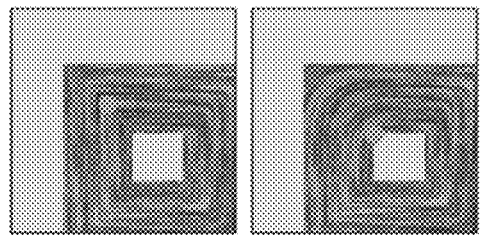
FIG. 17 is a schematic diagram of a movement of an end wedge degenerate point according to an embodiment.

In an embodiment, another major benefit of tensor field is that it allows for manipulation of degenerate points, for improving field topology for either smoother path generation or simplified path routing. To achieve this, two topological operations are used for the autonomous optimization of the tensor field: moving a single degenerate point and canceling a pair of degenerate points, and not interactive editing operation is required. The basic idea is to first convert the tensor field into a vector field: $V=\alpha(T)=\mu(\cos 2\theta, \sin 2\theta)^T$. Then perform the corresponding editing operation on tensor field V to obtain V', and then convert it back to a tensor field $T'=\alpha^{-1}(V')$. FIG. 16 is a flowchart of a step of a degenerate point movement according to an embodiment. The movement step of the degenerate point is a movement of the degenerate point in the topological graph after the generation of the scene topological graph and before the robot moves, the movement of the degenerate point can include:

In step S1602, degenerate points on the robot planning path are traversed;

In step S1604, when a traversed degenerate point is a wedge degenerate point, then it is determined whether the wedge degenerate point is an end point of the scene topological graph.

In particular, the movement of the degenerate point can have three situations, the first situation is the wedge degenerate point is the end point of the scene topological graph, and the intersection angle between the two split path of the wedge degenerate point is less than 90 degrees. The second situation is the degenerate point is a wedge degenerate point which is an end point of the scene topological graph. The third situation is the degenerate point is a trisector degenerate point, as such, it is first needed to determine the type of the degenerate point, the trisector degenerate point is easy to identify as it has two split paths, and a wedge degenerate point has only one path. And wedge degenerate points can be divided into end points and regular points according to the position of a wedge degenerate points.

In step S1606, when the wedge degenerate point is the end point of the scene topological graph, the wedge degenerate point is moved toward a direction away from the end point of the scene topological graph by a first preset distance. In particular, FIG. 7 is a schematic diagram of a movement of an end wedge degenerate point according to an embodiment, a wedge degenerate point usually represents an end point of the topological graph of the tensor field. Given such a wedge point, if there is no more information that can be gained after a round-trip has been made around that point, the robot does not need to re-visit that corner which, if being visited according to the advection generated path of the field, a deep U-turn path will be formed. To prevent this from happening, that wedge point is again moved inward along its two split path for a distance such that the path of exploration by the robot is shortened or that the exploration of this region is simply canceled.

In step S1608, when the intersection angle between the robot planning path replanned at the wedge degenerate point and the original robot planning path is less than 90 degrees, the wedge degenerate point is moved toward an opening of the intersection angle by a second preset distance.

Figure 18:
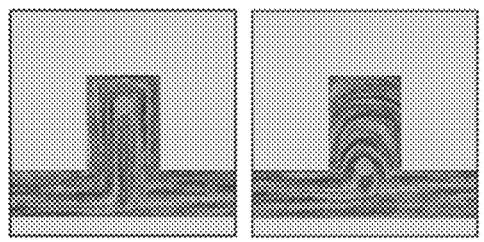
FIG. 18 is a schematic diagram of a movement of an ordinary wedge degenerate point according to an embodiment.

In particular, FIG. 18 is a schematic diagram of a movement of an ordinary wedge degenerate point according to an embodiment. If the intersection angle between its two split paths of the wedge degenerate point is less than 90 degrees, i.e., the replanned robot planning path and the original robot planning path is less than 90 degrees, which means that the wedge degenerate point is formed by the sharp corner, the wedge degenerate point can be moved inwardly to the corner. Such an arrangement is intended to avoid a sharp turn by the robot when it is passing by the wedge degenerate point.

In step S1610, when the degenerate point is a trisector degenerate point, the trisector degenerate point is moved toward a direction away from the projected region by a third preset distance according to the projected region in the preset plane.

Figure 19:
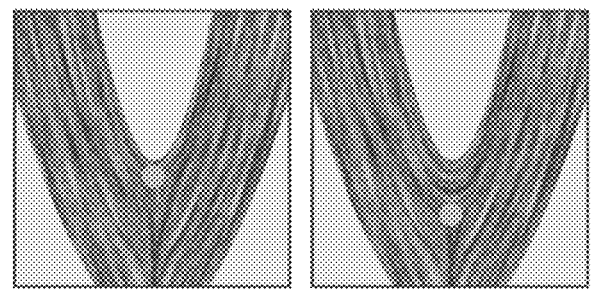
FIG. 19 is a schematic diagram of a trisector degenerate point according to an embodiment.
Figure 20:
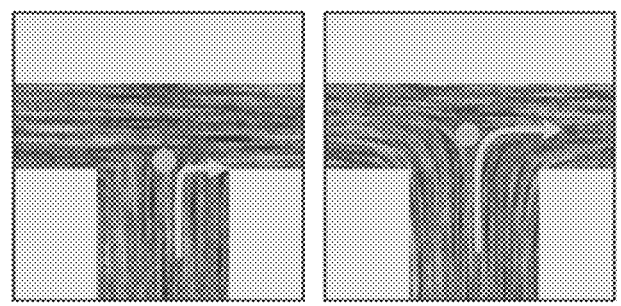
FIG. 20 is a schematic diagram of a trisector degenerate point according to an embodiment.

In particular, FIG. 19 is a schematic diagram of a trisector degenerate point according to an embodiment, and FIG. 20 is a schematic diagram of a trisector degenerate point according to an embodiment. In such a scenario, there is obstacle at a trisector degenerate point. As the robot tends to move along the dividing line of the trisector degenerate point, it is needed to ensure that the robot does not collide into an obstacle. This is done by moving the trisector away from obstacle when any obstacle is detected at this trisector degenerate point or along its dividing line.

In the above embodiment, the degenerate points on the robot planning path need to be processed in advance, such as moving the trisector degenerate point away from the obstacle, and removing the wedge degenerate point out of the corner etc. The robot planning path is optimized in advance, thereby ensuring the robot will not collide into obstacles in the walking.

Figure 21:
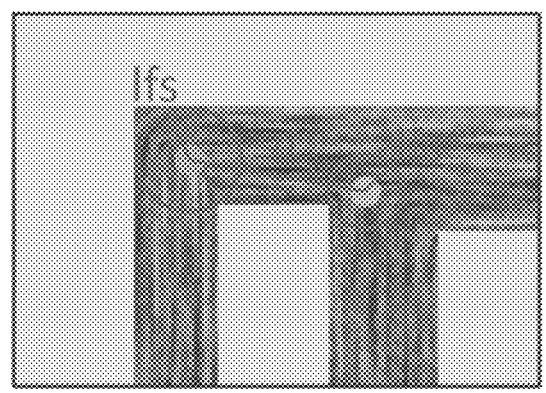
FIG. 21 is a schematic diagram of a non-cancelable degenerate point according to an embodiment.
Figure 22:
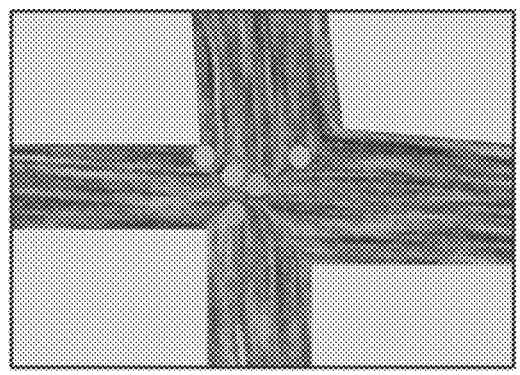
FIG. 22 is schematic diagram of a degenerate point before cancellation according to an embodiment.
Figure 23:
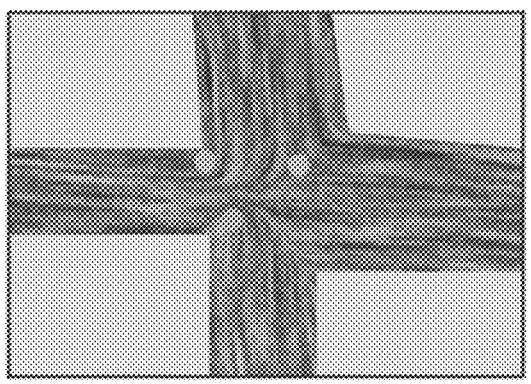
FIG. 23 is schematic diagram of a degenerate point after cancellation according to an embodiment.

In an embodiment, FIG. 21 is a schematic diagram of a non-cancelable degenerate point according to an embodiment, FIG. 22 is schematic diagram of a degenerate point before cancellation according to an embodiment, and FIG. 23 is schematic diagram of a degenerate point after cancellation according to an embodiment. In this embodiment, when the sum of distances respectively from the traversed wedge degenerate point and from the traversed trisector degenerate point to the projected region exceeds a distance between the traversed wedge degenerate point and the traversed trisector degenerate point, the traversed wedge degenerate point and the traversed trisector degenerate point are deleted, i.e., the wedge degenerate point and the trisector degenerate point are canceled.

Specifically, the degenerate point cancellation operation allows the cancellation of unwanted wedge-trisector (W-T) pairs, leading to a geometrically smoother and topologically simpler field. Unfortunately, not every W-T pair can be canceled since the wedge and/or trisector may indicate important topological features of the tensor field which might be destroyed if the edge degenerate point and the trisector degenerate point are canceled directly. Therefore, the identification of cancelable degenerate pairs is critical for this part. As such, if the distance between a W-T pair in a topological graph is close enough, the wedge degenerate point and the trisector degenerate point can be canceled. In defining the threshold, the significance of the W-T pair is first determined to find out whether a cancellation is needed. For example, the feature size of an individual degenerate point is defined, the distance from the point to the nearest geometric edge is used here, which is the distance from a degenerate point to the edge, i.e., to the projected region, as the projected region is formed by the projection of an existing object, such that the distance is the very distance from the degenerate point to the obstacle. As such, as for a W-T pair ($p_W$, $p_T$), if the distance between two points is less than the sum of the respectively distances from two individual points to the edge, a cancellation is performed.

$$d_s(p_W, p_T) < lfs(p_W) + lfs(p_T)$$

Where $d_s(\cdot,\cdot)$ is the shortest distance between two points and $lfs(\cdot)$ is the feature size of a degenerate point, i.e., the shortest distance from the point to the nearby boundary. As such, once a W-T pair to be canceled is detected, a small neighborhood surrounding them is found, within which the field is continuously iterated and update, until each point inside the region becomes regular (FIG. 21).

Having obtained the robot planning path, a camera planning path needs to be computed to scan the scene along this robot planning path. The camera shall be controlled in consideration of not only reconstruction efficiency and quality but also being constrained by the robot planning path.

Figure 24:
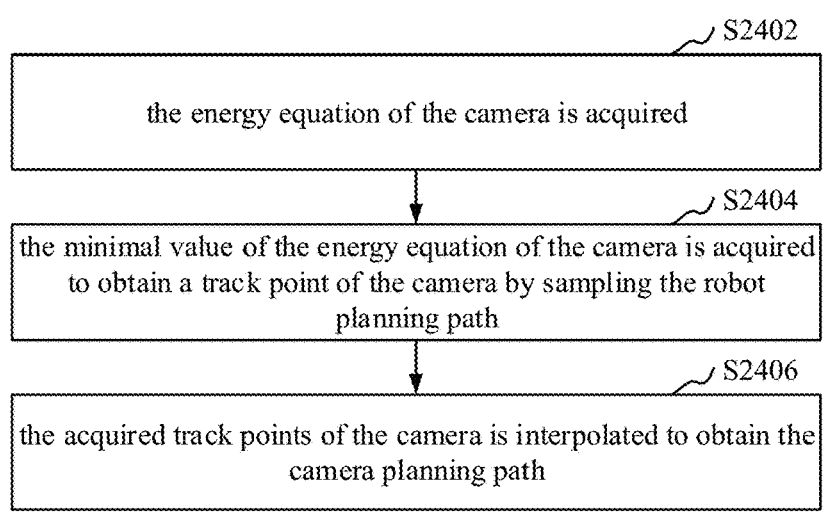
FIG. 24 is a flowchart of step S208 of FIG. 2.

According to an embodiment, FIG. 24 is a flowchart of step S208 of FIG. 2. Step S208, i.e., the step of acquiring the camera planning path comprises:

In step S2402, the energy equation of the camera is acquired;

In particular, the following condition must be satisfied to calculate the camera planning path: first of all, for the purpose of scanning efficiency, each point on the camera planning path shall ensure a maximal coverage on unscanned areas and unknown areas. However, to ensure a proper reconstruction quality, coverage on unknown areas alone is not enough, each scanning shall preferably be directed as possible to the normal of the target surfaces to ensure a best scanning quality. Second, to facilitate frame-to-frame registration during real-time reconstruction, linear and angular speed of the camera should not be exceeding a maximum threshold. Third, with a given robot planning path and the constraint of the robot base, to satisfy that each point of the camera on the robot arm can be reached by the robot. In consideration of the requirements above, the following energy equation is used to optimize the camera planning path:

$$E = \int_0^1 (-\omega_v V(q(t), \alpha(t)) + \omega_L q''(t) + \omega_A \alpha''(t)) dt$$

$$q(t) \in \Psi(p(t)), q'(t) < v_m, \alpha'(t) < \alpha m, t \in [0,1]$$

Where p(t) is a parametric curve segment representing the robot planning path, and q is the curve segment for the camera planning path, $\omega_v$ is the information gain, $\omega_L$ is the linear acceleration, and $\omega_A$ is the parameter of the angular acceleration. For each point on the path, the camera view includes a position q(t) and a viewing angle α(t). V(q(t),α(t)) measures information gain of the viewing angle in the reconstruction process, thereby measuring the quality of this viewing angle. Ψ(p(t)) is the collection of space areas where the arms can reach when the robot is standing at point p(t), $v_m$ and $a_m$ are respectively maximal thresholds of the linear speed and angular speed.

To solve this energy equation, the path p is sampled and the discretized energy function is minimized:

$$\text{minimize } E = -\omega_V \sum_s V(q_s, a_s) +$$

$$\omega_L \sum_s (q_{s-1} - 2q_s + q_{s+1}) + \omega_A \sum_s (a_{s-1} - 2a_s + a_{s+1})$$

$$q_s \in \Psi(p_s), q_{s+1} - q_{s-1} < 2v_m, a_{s+1} - a_{s-1} < 2a_m, s = 1, \ldots, S-1$$

Where $p_s$ is the sampling point on the robot planning path at time s, $q_s$ is the sampling point on the robot planning path at time s, $q_{s-1}$ is the sampling point on the robot planning path at time s−1, $q_{s+1}$ is the sampling point on the robot planning path at time s+1, $a_s$ is the camera viewing angle at time s, $a_{s-1}$ is the camera viewing angle at time s−1, $a_{s+1}$ is the camera viewing angle at time s+1.

This objective function is highly non-convex due to the difficulty in the estimation of reconstruction quality and robot arm workspace. This problem is therefore simplified by discretizing the feasible view space at a given point on the robot planning path into a discrete set of candidate views, and solve the problem of linear programming.

In step S2404, the minimal value of the energy equation of the camera is acquired to obtain a track point of the camera by sampling the robot planning path.

Figure 25:
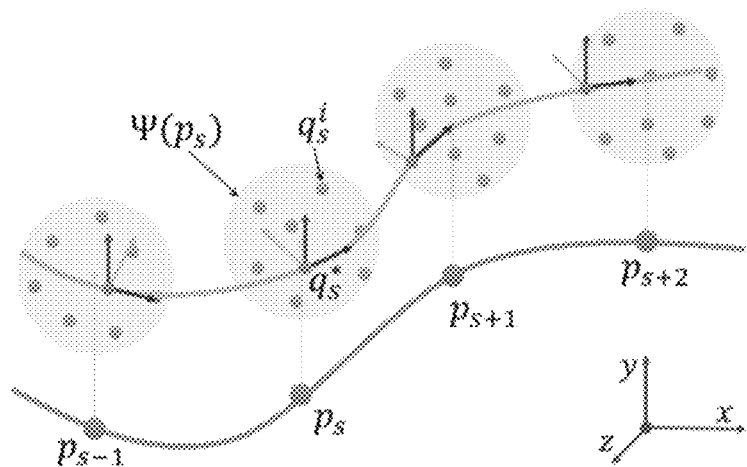
FIG. 25 is a schematic diagram of a robot planning path and a camera planning path according to an embodiment.

Specifically, on discrete view selection: for each path sample $p_s$, C points within the reachable space of the robot arm are sampled: $\{q_s^i \in \Psi(p_s)\}_{i=1}^C$. For each reachable point $q_s^i$ the best viewing angle $a_s^i$ is computed on the basis that the quality of the reconstruction is guaranteed, $a_s^i$ is the several camera viewing angles at point i at time s, such that a set of potential viewing point collections $\{(q_s^i, a_s^i)\}$ will present, as shown in FIG. 25. Thus, the optimization problem in this equation can be reduced to a 0-1 integer linear programming problem, which is, the value of each decision $x_s^i$ is 0 or 1. $x_s^i = 1$ suggests number i point of the sampling point $p_s$ is selected, or it is otherwise not selected if $x_s^i = 0$, the follow equation must be satisfied:

$$\text{minimize } E =$$

$$-\omega_V \sum_s \sum_i V(q_s^j, a_s^j) x_s^j + \omega_L \sum_s \sum_{i,j,k} (q_{s-1}^j - 2q_s^j + q_{s+1}^k) x_{s-1}^j x_s^j x_{s+1}^k +$$

$$\omega_A \sum_s \sum_{i,j,k} (a_{s-1}^j - 2a_s^j + a_{s+1}^k) x_{s-1}^j x_s^j x_{s+1}^k$$

$$(q_{s+1}^i - q_{s-1}^j) x_{s+1}^i x_{s-1}^j < 2v_m,$$

$$(a_{s+1}^i - a_{s-1}^j) x_{s+1}^i x_{s-1}^j < 2a_m,$$

$$x_s^j \in \{0, 1\}, \sum_k x_s^k = 1,$$

$$s = 1, \ldots, S-1,$$

$$i, j = 1, \ldots, C.$$

Where by providing $\Sigma_k x_s^k = 1$, each sampling point on the robot planning path is limited and only one candidate camera view can be selected.

In step S2406, the acquired track points of the camera is interpolated to obtain the camera planning path.

Figure 26:
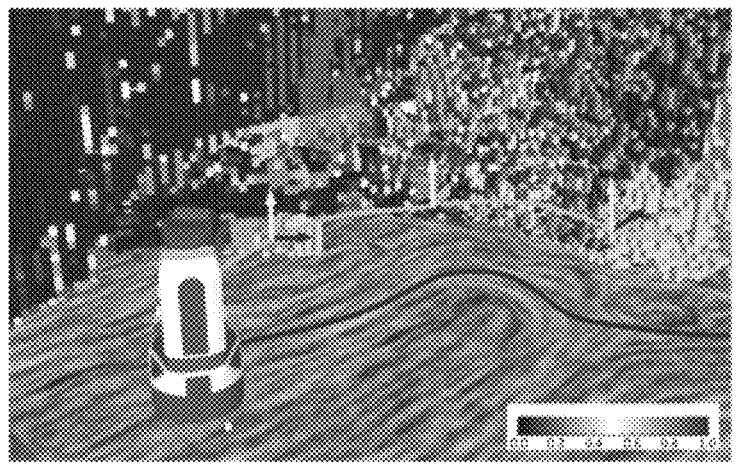
FIG. 26 is a schematic diagram of a robot planning path and a camera planning path in reality according to an embodiment.

In particular, for every point on the robot planning path, there is a corresponding position point of the camera on the arm, then the next step is to connect those best viewing points to formulate a smooth path. The cubic Hermite spline interpolation method is used herein to interpolate each viewing point. The tangent of the direction at each view point is computed as the cross product of the look-at vector of the camera and the y-axis by way dot product. The path is then interpolated based on rotation minimizing frames to ensure the total angular speed between the two interpolated frames is minimal. FIG. 26 shows an example of camera planning path computed along a robot planning path, the lower path is the robot planning path, the upper path is the computed camera planning path.

Figure 27:
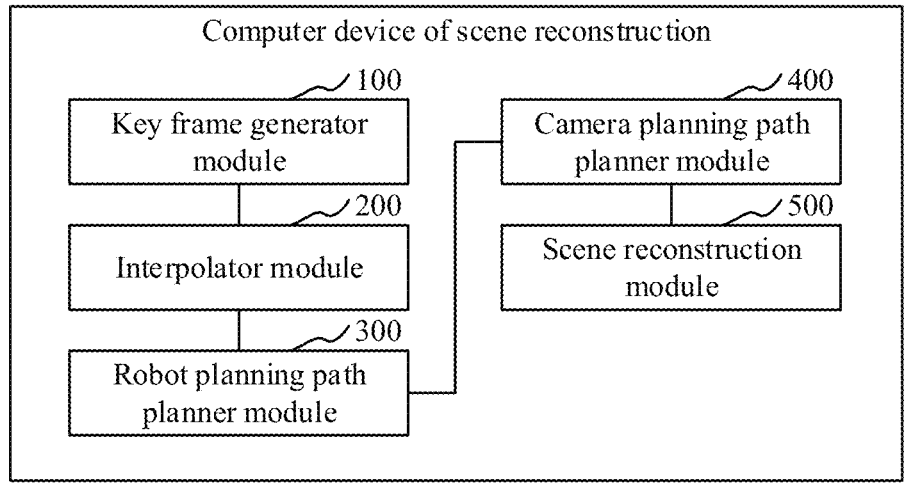
FIG. 27 is a block diagram of a computer device of scene reconstruction according to an embodiment.

FIG. 27 is a block diagram of a computer device of scene reconstruction according to an embodiment, the computer device of scene reconstruction includes:

a key frame generator module 100 configured to acquire a depth image from a camera and generating a current tensor field key frame based on the depth images;

an interpolator module 200 configured to perform spatial-temporal interpolation on the current tensor field key frame and a previous tensor field key frame to obtain an interpolated tensor field key frame;

a robot planning path planner module 300 configured to acquire a robot planning path by particle advection algorithm according to the current tensor field key frame, the previous tensor field key frame, and the interpolated tensor field key frame;

a camera planning path planner module 400 configured to acquire a camera planning path according to the robot planning path and an energy equation of the camera; and a scene reconstruction module 500 configured to reconstruct a scene according to the depth image captured by the robot along the robot planning path and the camera along the camera planning path.

In an embodiment, the key frame generator module 100 can include:

a region acquire unit configured to acquire a corresponding region in the depth image and of an object with a height equal or lower than the robot;

a projector unit configured to project the corresponding region in the depth image and of the object with the height equal or lower than the robot to a preset plane;

a constraint point sampler unit configured to perform a boundary point sampling to the projected region of the preset plane to acquire a constrained point;

a basis tensor acquire unit configured to acquire a basis tensor of the constraint point; and a generator unit, configured to generate the current tensor field key frame according to the basis tensors of the sampled constrained points.

In an embodiment, the interpolator module 200 can include:

a function formulator unit configured to acquire a scalar field of the current tensor field key frame and a scalar field of a previous tensor field key frame and formulating a bi-harmonic energy function; and a interpolated tensor field key frame acquire unit configured to minimize the bi-harmonic energy function to acquire the interpolated tensor field key frame using the scalar field of the current tensor field key frame and the scalar field of the previous tensor field key frame as dirichlet boundary conditions.

In an embodiment, the robot planning path planning module 300 can include:

a direction acquire unit configured to acquire directions of the current tensor field key frame, the previous tensor field key frame and the interpolated tensor field key frame according to the orientation of the robot;

a vector field acquire unit configured to acquire a vector field of the current tensor field key frame according to the direction of the current tensor field key frame, acquire a vector field of the previous tensor field key frame according to the direction of the previous tensor field key frame and acquire a vector field of the interpolated tensor field key frame according to the direction of the previous tensor field key frame; and a path planning unit configured to acquire the robot planning path according to the particle advection algorithm and through the following equation:

$$p(t)=p_0+\int_{\infty}^{t} V(p(s);t_0+t)ds$$

Where $p(t)$ is the robot planning path, $p_0$ is a robot position at time $t_0$, and $V(p(s); t_0+t)$ is a velocity of the robot at time $(t_0+t)$ and position $p(s)$.

In an embodiment, the computer device can include:

a topological graph generator module configured to acquire the degenerate points on the robot planning path and generate a scene topological graph according to the degenerate points on the robot planning path;

a degenerate point acquire module configured to, when the information gain of an edge in the scene topological graph exceeds a threshold value, acquire a degenerate point on the robot planning path and nearest to the robot;

a minimum spanning tree acquire module configured to, when the degenerate point on the robot planning path and nearest to the robot is a trisector degenerate point, acquire a minimum spanning tree of the scene topological graph according to a current position of the robot; and a path corrector module configured to calculate the cost of each minimal spanning tree and select the path corresponding to the minimal spanning tree with the lowest cost to correct the robot planning path; when the degenerate point on the robot planning path and nearest to the robot is a wedge degenerate point, when the robot walks to the wedge degenerate point, the robot planning path of the robot is replanned.

In an embodiment, the computer device can further include:

a traverser module configured to traverse the degenerate points on the robot planning path, and when a traversed degenerate point is a wedge degenerate point, then it is determined whether the wedge degenerate point is an end point of the scene topological graph; and a degenerate mover module configured to, when the wedge degenerate point is the end point of the scene topological graph, move the wedge degenerate point toward a direction away from the end point of the scene topological graph by a first preset distance; when the intersection angle between the robot planning path replanned at the wedge degenerate point and the original robot planning path is less than 90 degrees, move the wedge degenerate point toward an opening of the intersection angle by a second preset distance; and when the degenerate point is a trisector degenerate point, move the trisector degenerate point toward a direction away from the projected region by a third preset distance according to the projected region in the preset plane.

In an embodiment, the computer device can further include: a degenerate point delete module configured to, when the sum of distances respectively from the traversed wedge degenerate point and from the traversed trisector degenerate point to the projected region exceeds a distance between the traversed wedge degenerate point and the traversed trisector degenerate point, delete the traversed wedge degenerate point and the traversed trisector degenerate point.

In an embodiment, the camera planning path planning module 400 include:

an energy equation acquire unit configured to acquire camera energy equation;

a robot planning path sampling unit configured to acquire the minimal value of the energy equation of the camera to obtain a track point of the camera by sampling the robot planning path; and an interpolation unit configured to interpolate the acquired camera planning path points to obtain the camera planning path.

The particular limitation as on the computer device of scene reconstruction can be referred by foregoing limitation on the method of scene reconstruction and is omitted for brevity.

Figure 28:
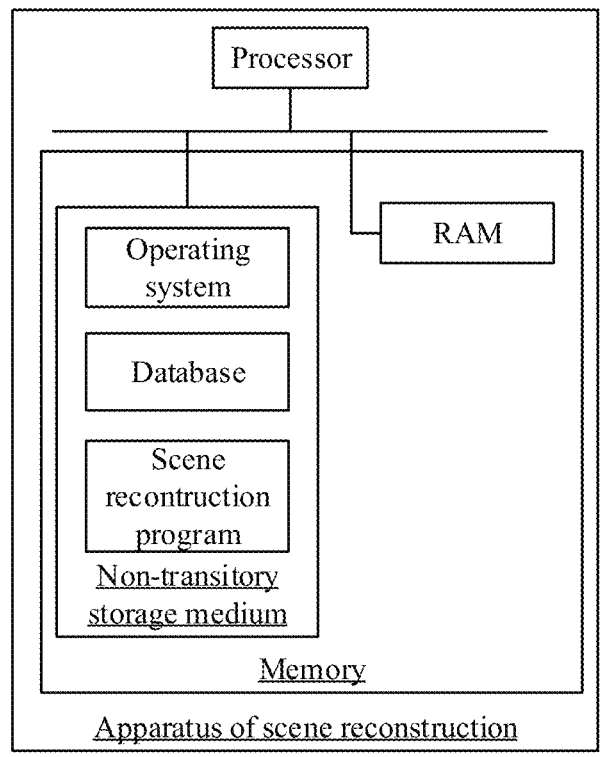
FIG. 28 is a block diagram of an apparatus according to an embodiment.

Referring to FIG. 28, which is a block diagram of an apparatus of scene reconstruction according to an embodiment. This apparatus can be integrated in the robot, include memory, processor and the instructions stored in the memory, this memory can include non-transitory storage medium and RANI memory. The instructions can be stored in the non-transitory storage medium, the processor implement these steps: a depth image taken by a camera mounted on a robot is acquired, and a current tensor field key frame is generated based on the depth image; spatial-temporal interpolation is performed on the current tensor field key frame and a previous tensor field key frame to obtain an interpolated tensor field key frame; a robot planning path is acquired by particle advection algorithm according to the current tensor field key frame, the previous tensor field key frame, and the interpolated tensor field key frame; a camera planning path is acquired according to the robot planning path and an energy equation of the camera; and a scene is reconstructed according to the depth image captured by the robot along the robot planning path and the camera along the camera planning path.

In an embodiment, the processor executes the instructions to further implement the following steps: a corresponding region in the depth image and of an object with a height equal or lower than the robot is acquired; the corresponding region in the depth image and of the object with the height equal or lower than the robot is projected to a preset plane; a boundary point sampling is performed to the projected region of the preset plane to acquire a constraint point; a basis tensor of the constraint point is acquired; and the current tensor field key frame is generated according to the basis tensors of the sampled constraint points.

In an embodiment, the processor executes the instructions to further provide following steps: a scalar field of the current tensor field key frame and a scalar field of a previous tensor field key frame are acquired and a bi-harmonic energy function is formulated; and the bi-harmonic energy function is minimized to acquire the interpolated tensor field key frame using the scalar field of the current tensor field key frame and the scalar field of the previous tensor field key frame as dirichlet boundary conditions.

In an embodiment, the processor executes the instructions to further provide following steps: directions of the current tensor field key frame, the previous tensor field key frame and the interpolated tensor field key frame are acquired according to the orientation of the robot; a vector field of the current tensor field key frame is acquired according to the direction of the current tensor field key frame, a vector field of the previous tensor field key frame is acquired according to the direction of the previous tensor field key frame and a vector field of the interpolated tensor field key frame is acquired according to the direction of the previous tensor field key frame; and the robot planning path is acquired according to the particle advection algorithm and through the following equation:

$$p(t)=p_0+\int_0^t V(p(s);t_0+t)ds$$

Where $p(t)$ is the robot planning path, $p_0$ is a robot position at time $t_0$, and $V(p(s);t_0+t)$ is a velocity of the robot at time $(t_0+t)$ and position.

In an embodiment, the processor executes the instructions to further provide following steps: degenerate points on the robot planning path are acquired and a scene topological graph is generated according to the degenerate points on the robot planning path; an information gain of each edge in the scene topological graph is acquired; when the information gain of an edge in the scene topological graph exceeds a threshold value, a degenerate point on the robot planning path and nearest to the robot is acquired; when the degenerate point on the robot planning path and nearest to the robot is a trisector degenerate point, a minimum spanning tree of the scene topological graph is acquired according to a current position of the robot; a cost of each minimum spanning tree is calculated and a path corresponding to a minimum spanning tree with a minimal cost is selected to correct the robot planning path; and when the degenerate point on the robot planning path and nearest to the robot is a wedge degenerate point, when the robot walks to the wedge degenerate point, the robot planning path of the robot is replanned.

In an embodiment, the processor executes the instructions to further provide following steps: degenerate points on the robot planning path are traversed, and when a traversed degenerate point is a wedge degenerate point, then it is determined whether the wedge degenerate point is an end point of the scene topological graph; when the wedge degenerate point is the end point of the scene topological graph, the wedge degenerate point is moved toward a direction away from the end point of the scene topological graph by a first preset distance; when the intersection angle between the robot planning path replanned at the wedge degenerate point and the original robot planning path is less than 90 degrees, the wedge degenerate point is moved toward an opening of the intersection angle by a second preset distance; and when the degenerate point is a trisector degenerate point, the trisector degenerate point is moved toward a direction away from the projected region by a third preset distance according to the projected region in the preset plane.

In an embodiment, the processor executes the instructions to further provide following steps: when the sum of distances respectively from the traversed wedge degenerate point and from the traversed trisector degenerate point to the projected region exceeds a distance between the traversed wedge degenerate point and the traversed trisector degenerate point, the traversed wedge degenerate point and the traversed trisector degenerate point are deleted.

In an embodiment, the processor executes the instructions to further provide following steps: the energy equation of the camera is acquired; the minimal value of the energy equation of the camera is acquired to obtain a track point of the camera by sampling the robot planning path; and the acquired track points of the camera are interpolated to obtain the camera planning path.

The particular limitation as on the apparatus can be referred by foregoing limitation on the method of scene reconstruction and is omitted for brevity.

Referring to FIG. 28, at least one non-transitory computer-readable storage medium having computer instructions stored thereon is provided, the computer instructions is executed by the processor to provide following steps: a depth image taken by a camera mounted on a robot is acquired, and a current tensor field key frame is generated based on the depth image; spatial-temporal interpolation is performed on the current tensor field key frame and a previous tensor field key frame to obtain an interpolated tensor field key frame; a robot planning path is acquired by particle advection algorithm according to the current tensor field key frame, the previous tensor field key frame, and the interpolated tensor field key frame; a camera planning path is acquired according to the robot planning path and an energy equation of the camera; and a scene is reconstructed according to the depth image captured by the robot along the robot planning path and the camera along the camera planning path.

In an embodiment, the processor executes the instructions to further implement the following steps: a corresponding region in the depth image and of an object with a height equal or lower than the robot is acquired;

The corresponding region in the depth image and of the object with the height equal or lower than the robot is projected to a preset plane;

A boundary point sampling is performed to the projected region of the preset plane to acquire a constraint point; a basis tensor of the constraint point is acquired; and the current tensor field key frame is generated according to the basis tensors of sampled constraint points.

In an embodiment, the processor executes the instructions to further provide following steps: a scalar field of the current tensor field key frame and a scalar field of a previous tensor field key frame are acquired and a bi-harmonic energy function is formulated; and the bi-harmonic energy function is minimized to acquire the interpolated tensor field key frame using the scalar field of the current tensor field key frame and the scalar field of the previous tensor field key frame as dirichlet boundary conditions.

In an embodiment, the processor executes the instructions to further provide following steps: directions of the current tensor field key frame, the previous tensor field key frame and the interpolated tensor field key frame are acquired according to the orientation of the robot; a vector field of the current tensor field key frame is acquired according to the direction of the current tensor field key frame, a vector field of the previous tensor field key frame is acquired according to the direction of the previous tensor field key frame and a vector field of the interpolated tensor field key frame is acquired according to the direction of the previous tensor field key frame; and the robot planning path is acquired according to the particle advection algorithm and through the following equation:

$$p(t)=p_0+\int_0^t V(p(s);t_0+t)ds$$

Where $p(t)$ is the robot planning path, $p_0$ is a robot position at time $t_0$, and $V(p(s); t_0+t)$ is a velocity of the robot at time $(t_0+t)$ and position $p(s)$.

In an embodiment, the processor executes the instructions to further provide following steps: degenerate points on the robot planning path are acquired and a scene topological graph is generated according to the degenerate points on the robot planning path; an information gain of each edge in the scene topological graph is acquired; when the information gain of an edge in the scene topological graph exceeds a threshold value, a degenerate point on the robot planning path and nearest to the robot is acquired; when the degenerate point on the robot planning path and nearest to the robot is a trisector degenerate point, a minimum spanning tree of the scene topological graph is acquired according to a current position of the robot; a cost of each minimum spanning tree is calculated and a path corresponding to a minimum spanning tree with a minimal cost is selected to correct the robot planning path; and when the degenerate point on the robot planning path and nearest to the robot is a wedge degenerate point, when the robot walks to the wedge degenerate point, the robot planning path of the robot is replanned.

In an embodiment, the processor executes the instructions to further provide following steps: degenerate points on the robot planning path are traversed, and when a traversed degenerate point is a wedge degenerate point, then it is determined whether the wedge degenerate point is an end point of the scene topological graph; when the wedge degenerate point is the end point of the scene topological graph, the wedge degenerate point is moved toward a direction away from the end point of the scene topological graph by a first preset distance; when the intersection angle between the robot planning path replanned at the wedge degenerate point and the original robot planning path is less than 90 degrees, the wedge degenerate point is moved toward an opening of the intersection angle by a second preset distance; and when the degenerate point is a trisector degenerate point, the trisector degenerate point is moved toward a direction away from the projected region by a third preset distance according to the projected region in the preset plane.

In an embodiment, the processor executes the instructions to further provide following steps: when the sum of distances respectively from the traversed wedge degenerate point and from the traversed trisector degenerate point to the projected region exceeds a distance between the traversed wedge degenerate point and the traversed trisector degenerate point, the traversed wedge degenerate point and the traversed trisector degenerate point are deleted.

In an embodiment, the processor executes the instructions to further provide following steps: the energy equation of the camera is acquired; the minimal value of the energy equation of the camera is acquired to obtain a track point of the camera by sampling the robot planning path; and the acquired track points of the camera are interpolated to obtain the camera planning path.

The particular limitation as on the computer-readable storage medium can be referred by foregoing limitation on the method of scene reconstruction and is omitted for brevity.

A person skilled in the art should understand that the processes of the methods in the above embodiments can be, in full or in part, implemented by computer programs instructing underlying hardware, the programs can be stored in the at least one non-transitory computer-readable storage medium, the program can include the processes in the embodiments of the various methods when it is being executed. The storage medium can be a disk, a CD, a Read-Only Memory (ROM) and so on.

The different technical features of the above embodiments can have various combinations which are not described for the purpose of brevity. Nevertheless, to the extent the combining of the different technical features do not conflict with each other, all such combinations must be regarded as being within the scope of the disclosure.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method of scene reconstruction, comprising:
   acquiring a depth image taken by a camera mounted on a robot and generating a current tensor field key frame according to the depth image;
   performing spatial-temporal interpolation to the current tensor field key frame and a previous tensor field key frame to obtain an interpolated tensor field key frame;
   acquiring a robot planning path by particle advection algorithm according to the current tensor field key frame, the previous tensor field key frame, and the interpolated tensor field key frame;
   acquiring a camera planning path according to the robot planning path and an energy equation of the camera; and
   enabling the robot to walk along the robot planning path, acquiring the depth images taken by the camera along the camera planning path, and reconstructing a scene according to the depth images,
   wherein the generating the current tensor field key frame based on the depth image comprises:
   acquiring a corresponding region in the depth image and of an object with a height equal to or less than a height of the robot;
   projecting the corresponding region to a preset plane;
   performing a boundary point sampling to a projected region of the preset plane to acquire a constraint point;
   acquiring a basis tensor of the constraint point; and
   generating the current tensor field key frame according to the basis tensors of sampled constraint points.

2. The method of claim 1, wherein the performing spatial-temporal interpolation on the current tensor field key frame and a previous tensor field key frame to obtain an interpolated tensor field key frame comprises:
   acquiring a scalar field of the current tensor field key frame and a scalar field of a previous tensor field key frame and formulating a bi-harmonic energy function; and
   minimizing the bi-harmonic energy function to acquire the interpolated tensor field key frame using the scalar field of the current tensor field key frame and the scalar field of the previous tensor field key frame as dirichlet boundary conditions.

3. The method of claim 2, wherein the acquiring the robot planning path by particle advection algorithm according to the current tensor field key frame, the previous tensor field key frame, and the interpolated tensor field key frame comprises:
   acquiring directions of the current tensor field key frame, the previous tensor field key frame and the interpolated tensor field key frame according to an orientation of the robot;
   acquiring a vector field of the current tensor field key frame according to the direction of the current tensor field key frame, acquiring a vector field of the previous tensor field key frame according to the direction of the previous tensor field key frame and acquiring a vector field of the interpolated tensor field key frame according to the direction of the previous tensor field key frame; and
   acquiring the robot planning path according to particle advection algorithm and through the following equation:

$$p(t)=p_0+\int_0^t V(p(s);t_0+t)ds$$

wherein $p(t)$ is the robot planning path, $p_0$ is a robot position at time $t_0$, and $V(p(s); t_0+t)$ is a velocity of the robot at time $(t_0+t)$ and position $p(s)$.

4. The method of claim 3, further comprising:
   acquiring degenerate points on the robot planning path and generating a scene topological graph according to the degenerate points on the robot planning path;
   acquiring an information gain of each edge in the scene topological graph;
   acquiring a degenerate point on the robot planning path and nearest to the robot, when the information gain of an edge in the scene topological graph exceeds a threshold value;
   acquiring a minimum spanning tree of the scene topological graph according to a current position of the robot when the degenerate point on the robot planning path and nearest to the robot is a trisector degenerate point; and
   calculating a cost of each minimum spanning tree and selecting a path corresponding to a minimum spanning tree with a minimal cost to correct the robot planning path.

5. The method of claim 4, further comprising:
   when the degenerate point on the robot planning path and nearest to the robot is a wedge degenerate point, re-planning the robot planning path when the robot travels to the wedge degenerate point.

6. The method of claim 3, further comprising:
   traversing degenerate points on the robot planning path, and when a traversed degenerate point is a wedge degenerate point, determining whether the wedge degenerate point is an end point of the scene topological graph; and
   when the wedge degenerate point is the end point of the scene topological graph, moving the wedge degenerate point toward a direction away from the end point of the scene topological graph by a first preset distance.

7. The method of claim 6, further comprising:
   when the intersection angle between the robot planning path replanned at the wedge degenerate point and the original robot planning path is less than 90 degrees, moving the wedge degenerate point toward an opening of the intersection angle by a second preset distance.

8. The method of claim 7, further comprising:
   when the degenerate point is a trisector degenerate point, moving the trisector degenerate point toward a direction away from the projected region by a third preset distance according to the projected region in the preset plane.

9. The method of claim 8, further comprising:
   deleting the traversed wedge degenerate point and the traversed trisector degenerate point, when the sum of distances respectively from the traversed wedge degenerate point and from the traversed trisector degenerate point to the projected region exceeds a distance between the traversed wedge degenerate point and the traversed trisector degenerate point.

10. The method of claim 1, wherein the acquiring the camera planning path according to the robot planning path and the energy equation of the camera comprises:
acquiring the energy equation of the camera;
acquiring the minimal value of the energy equation of the camera by sampling the robot planning path to obtain a track point of the camera; and
interpolating the acquired track points of the camera to obtain the camera planning path.

11. An apparatus, comprising at least one memory storing instructions; and at least one processor that executes the instructions to cause the following operations to be performed:
acquiring a depth image taken by a camera mounted on a robot and generating a current tensor field key frame according to the depth image;
performing spatial-temporal interpolation to the current tensor field key frame and a previous tensor field key frame to obtain an interpolated tensor field key frame;
acquiring a robot planning path by particle advection algorithm according to the current tensor field key frame, the previous tensor field key frame, and the interpolated tensor field key frame;
acquiring a camera planning path according to the robot planning path and an energy equation of the camera; and
enabling the robot to walk along the robot planning path, acquiring the depth images taken by the camera along the camera planning path, and reconstructing a scene according to the depth images,
wherein the generating the current tensor field key frame based on the depth image comprises:
acquiring a corresponding region in the depth image and of an object with a height equal to or less than a height of the robot;
projecting the corresponding region to a preset plane;
performing a boundary point sampling to a projected region of the preset plane to acquire a constraint point;
acquiring a basis tensor of the constraint point; and
generating the current tensor field key frame according to the basis tensors of sampled constraint points.

12. The apparatus of claim 11, wherein the performing spatial-temporal interpolation on the current tensor field key frame and a previous tensor field key frame to obtain an interpolated tensor field key frame comprises:
acquiring a scalar field of the current tensor field key frame and a scalar field of a previous tensor field key frame and formulating a bi-harmonic energy function; and
minimizing the bi-harmonic energy function to acquire the interpolated tensor field key frame using the scalar field of the current tensor field key frame and the scalar field of the previous tensor field key frame as dirichlet boundary conditions.

13. The apparatus of claim 12, wherein the acquiring the robot planning path by particle advection algorithm according to the current tensor field key frame, the previous tensor field key frame, and the interpolated tensor field key frame comprises:
acquiring directions of the current tensor field key frame, the previous tensor field key frame and the interpolated tensor field key frame according to an orientation of the robot;
acquiring a vector field of the current tensor field key frame according to the direction of the current tensor field key frame, acquiring a vector field of the previous tensor field key frame according to the direction of the previous tensor field key frame and acquiring a vector field of the interpolated tensor field key frame according to the direction of the previous tensor field key frame; and
acquiring the robot planning path according to particle advection algorithm and through the following equation:

$$p(t)=p_0+\int_0^t V(p(s);t_0+t)ds$$

wherein p(t) is the robot planning path, $p_0$ is a robot position at time $t_0$, and $V(p(s); t_0+t)$ is a velocity of the robot at time $(t_0+t)$ and position $p(s)$.

14. The apparatus of claim 13, the at least one memory further stores instructions, and the at least one processor executes the instructions to cause the following operations to be performed:
acquiring degenerate points on the robot planning path and generating a scene topological graph according to the degenerate points on the robot planning path;
acquiring an information gain of each edge in the scene topological graph;
acquiring a degenerate point on the robot planning path and nearest to the robot, when the information gain of an edge in the scene topological graph exceeds a threshold value;
acquiring a minimum spanning tree of the scene topological graph according to a current position of the robot when the degenerate point on the robot planning path and nearest to the robot is a trisector degenerate point; and
calculating a cost of each minimum spanning tree and selecting a path corresponding to a minimum spanning tree with a minimal cost to correct the robot planning path.

15. The apparatus of claim 13, the at least one memory further stores instructions, and the at least one processor executes the instructions to cause the following operations to be performed:
when the degenerate point on the robot planning path and nearest to the robot is a wedge degenerate point, re-planning the robot planning path when the robot travels to the wedge degenerate point.

16. The apparatus of claim 13, the at least one memory further stores instructions, and the at least one processor executes the instructions to cause the following operations to be performed:
traversing degenerate points on the robot planning path, and when a traversed degenerate point is a wedge degenerate point, determining whether the wedge degenerate point is an end point of the scene topological graph; and
when the wedge degenerate point is the end point of the scene topological graph, moving the wedge degenerate point toward a direction away from the end point of the scene topological graph by a first preset distance.

17. The apparatus of claim 13, the at least one memory further stores instructions, and the at least one processor executes the instructions to cause the following operations to be performed:
when the intersection angle between the robot planning path replanned at the wedge degenerate point and the original robot planning path is less than 90 degrees, moving the wedge degenerate point toward an opening of the intersection angle by a second preset distance.

18. At least one non-transitory computer-readable storage medium having instructions stored thereon that, when executed by at least one processor, cause the following operations to be performed:
- acquiring a depth image taken by a camera mounted on a robot and generating a current tensor field key frame according to the depth image;
- performing spatial-temporal interpolation to the current tensor field key frame and a previous tensor field key frame to obtain an interpolated tensor field key frame;
- acquiring a robot planning path by particle advection algorithm according to the current tensor field key frame, the previous tensor field key frame, and the interpolated tensor field key frame;
- acquiring a camera planning path according to the robot planning path and an energy equation of the camera; and
- enabling the robot to walk along the robot planning path, acquiring the depth images taken by the camera along the camera planning path, and reconstructing a scene according to the depth images,
- wherein the generating the current tensor field key frame based on the depth image comprises:
- acquiring a corresponding region in the depth image and of an object with a height equal to or less than a height of the robot;
- projecting the corresponding region to a preset plane;
- performing a boundary point sampling to a projected region of the preset plane to acquire a constraint point;
- acquiring a basis tensor of the constraint point; and
- generating the current tensor field key frame according to the basis tensors of sampled constraint points.

* * * * *